(12) United States Patent
Larsson et al.

(10) Patent No.: US 12,145,541 B2
(45) Date of Patent: Nov. 19, 2024

(54) LOAD CARRIER

(71) Applicant: Thule Sweden AB, Hillerstorp (SE)

(72) Inventors: Fredrik Larsson, Vaggeryd Jönköping (SE); Anders Nilvius, Värnamo (SE); Victor Millberg, Värnamo (SE)

(73) Assignee: Thule Sweden AB, Hillerstorp (SE)

( * ) Notice: Subject to any disclaimer, the term of this patent is extended or adjusted under 35 U.S.C. 154(b) by 0 days.

(21) Appl. No.: 17/254,045

(22) PCT Filed: Jun. 25, 2019

(86) PCT No.: PCT/EP2019/066858
§ 371 (c)(1),
(2) Date: Dec. 18, 2020

(87) PCT Pub. No.: WO2020/007656
PCT Pub. Date: Jan. 9, 2020

(65) Prior Publication Data
US 2021/0245669 A1     Aug. 12, 2021

(30) Foreign Application Priority Data
Jul. 2, 2018  (EP) ..................... 18181258

(51) Int. Cl.
*B60R 9/052* (2006.01)
*B60R 9/048* (2006.01)

(52) U.S. Cl.
CPC .............. *B60R 9/052* (2013.01); *B60R 9/048* (2013.01)

(58) Field of Classification Search
CPC ............ B60R 9/052; B60R 9/048; B60R 9/05
See application file for complete search history.

(56) References Cited

U.S. PATENT DOCUMENTS 5,833,389 A * 11/1998 Sirovich ................. B64C 21/10
405/52
6,176,404 B1 * 1/2001 Fourel ..................... B60R 9/052
224/309

(Continued)

FOREIGN PATENT DOCUMENTS

AU        200072352 A  *  6/2001
DE           4113230 A  * 10/1992  ............... B60R 9/05

(Continued)

OTHER PUBLICATIONS

International Search Report and Written Opinion of the International Searching Authority in International Application No. PCT/EP2019/066858 (9 pages).

(Continued)

*Primary Examiner* — Scott T McNurlen
(74) *Attorney, Agent, or Firm* — Sterne, Kessler, Goldstein & Fox P.L.L.C.

(57) ABSTRACT

The present disclosure relates to a roof rack load carrying bar having a channel for receiving at least one mounting member for attaching a load carrying bar accessory to the load carrying bar, the channel extending at least partly in a length direction of the load carrying bar, a first and a second cover extending in the length direction of the load carrying bar and being arranged for sealing the channel from an external environment, the first cover being attached to the load carrying bar via a first attachment interface provided at a first side of the channel, the second cover being attached to the load carrying bar via a second attachment interface provided at a second side of the channel, wherein the first and the second attachment interface being asymmetrical with respect to each other.

24 Claims, 7 Drawing Sheets

(56) References Cited

U.S. PATENT DOCUMENTS

| | | | | |
|---|---|---|---|---|
| D633,031 S | * | 2/2011 | Robertson | D12/412 |
| D695,206 S | * | 12/2013 | Eriksson | D12/414 |
| 9,421,918 B2 | * | 8/2016 | Lundgren | B60R 9/058 |
| 2003/0026008 A1 | * | 2/2003 | Tanaka | B60R 1/06 |
| | | | | 359/838 |
| 2016/0082892 A1 | * | 3/2016 | Ferman | B60R 9/052 |
| | | | | 224/322 |
| 2018/0236946 A1 | * | 8/2018 | Shen | B60R 9/052 |

FOREIGN PATENT DOCUMENTS

| | | | |
|---|---|---|---|
| DE | 10 2013 016 123 A1 | 4/2015 | |
| DE | 20 2014 010 315 U1 | 4/2015 | |
| FR | 2751286 A1 * | 1/1998 | B60R 9/05 |
| NZ | 501827 A * | 2/2001 | B60R 9/05 |
| TW | 541967 U | 5/2017 | |
| WO | 01/98109 A1 | 12/2001 | |

OTHER PUBLICATIONS

European Search Report issued in European Application No. 20180411.9, mailed Sep. 11, 2020 (3 pages).

* cited by examiner

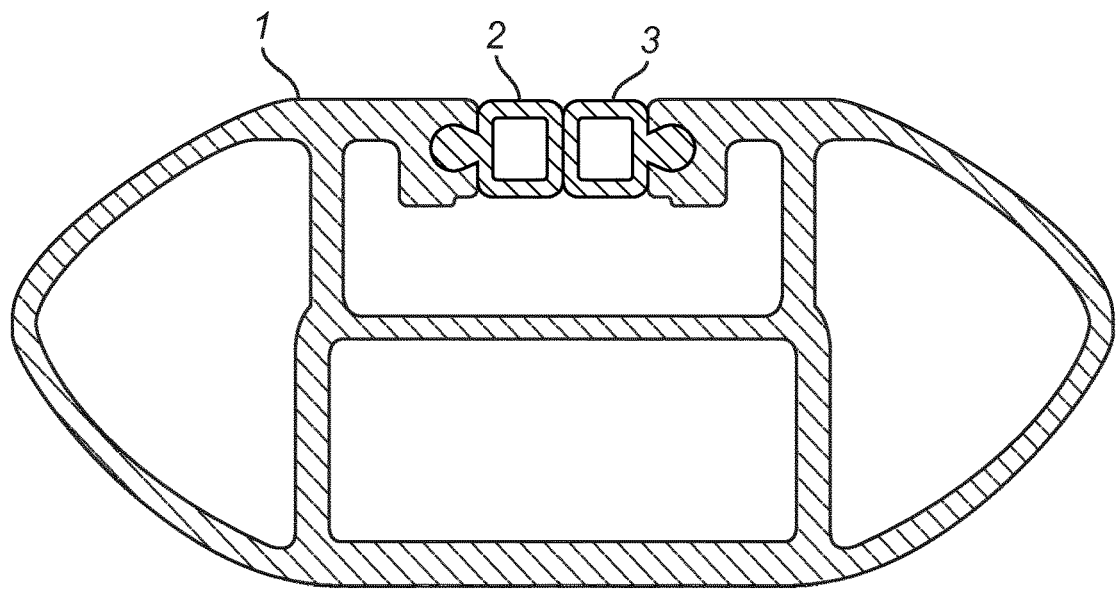
(Prior art) Fig. 1
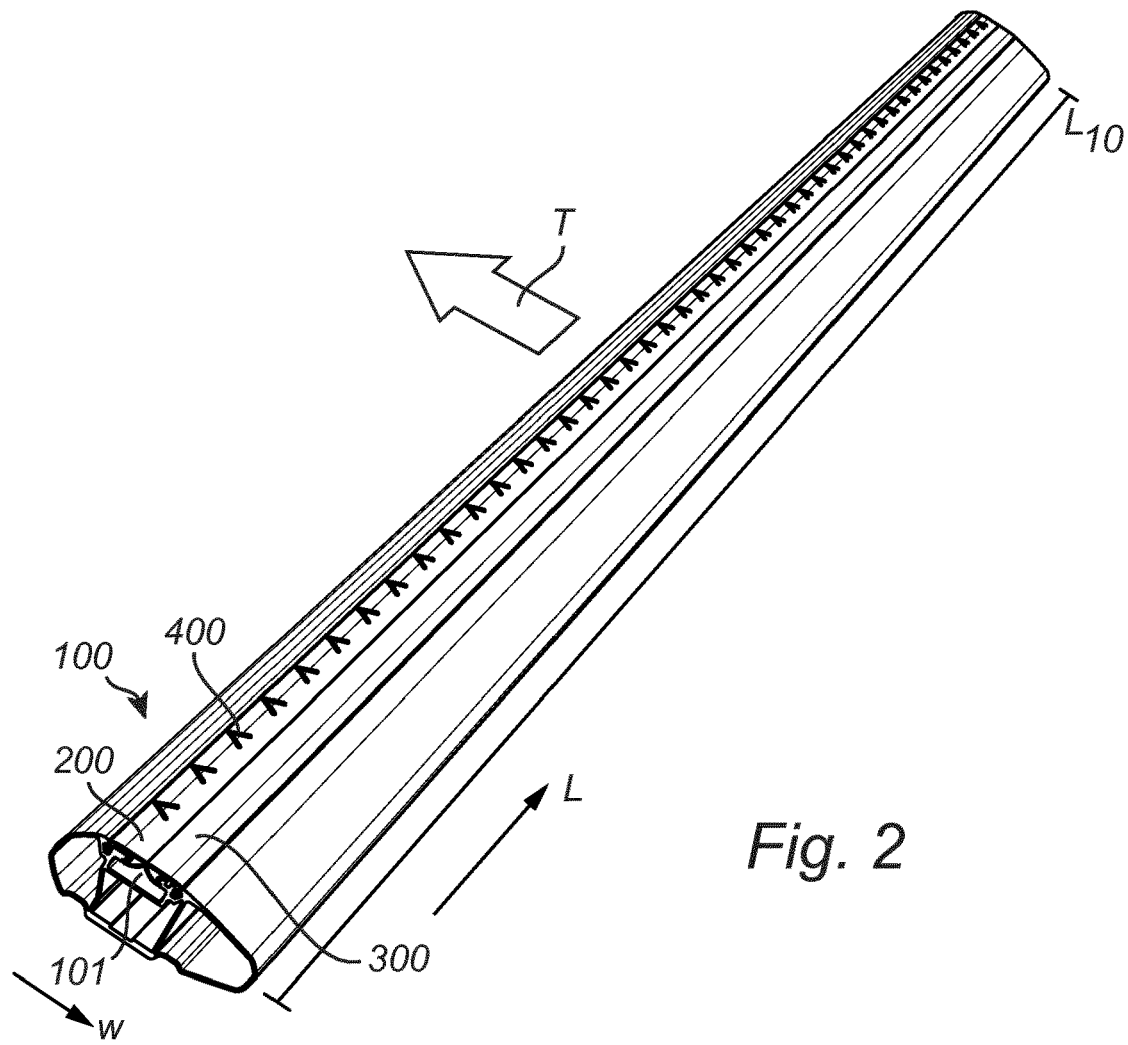
Fig. 2

LOAD CARRIER

TECHNICAL FIELD

The present disclosure relates to a roof rack load carrying bar comprising a channel for receiving at least one mounting member for attaching a load carrying bar accessory to the load carrying bar, the channel extending at least partly in a length direction of the load carrying bar.

The present disclosure also relates to a roof rack load carrying bar comprising an airflow regulating pattern extending in a length direction of the load carrying bar, the pattern comprising at least two raised rib portions relatively offset from each other in the length direction of the load carrying bar.

Still further, the present disclosure relates to a roof rack load carrying bar comprising a cross sectional profile having a front bar portion and a rear bar portion with respect to a travel direction of said load carrying bar during use, the front bar portion having a front edge, the rear bar portion having a profile tapering rearwards with respect to the travel direction and towards a rear edge of the rear bar portion, the front edge comprising a first curved-shaped profile extending from an upper portion to a lower portion of the front bar portion.

BACKGROUND

Roof racks comprising load carrying bars are known for providing improved load capacity for automobiles.

There are different types of load carrying bars, where one type comprises an integrated channel for receiving mounting members, such as screws, intended for attaching load carrying bar accessories to the load carrying bar. Load carrying bar accessories may be roof boxes, ski boxes, ski carriers, bike carriers etc. One example of a roof rack load carrying bar comprising such a channel can be found in EP 2 803 535 A1, which discloses to make use of a single cover, or two covers, for sealing the opening of the channel.

These types of load carrying bars have shown to provide an efficient and convenient way for attaching different accessories to the vehicle, compared to load carrying bars without such integrated channels.

Moreover, a trend relating to load carrying bars is to adapt the cross section of the load carrying bar to reduce wind resistance and/or noise. Several solutions aiming to reduce this problem have been suggested, where sharp/distinct edges in the cross section have been avoided in order to reduce drag and/or noise.

SUMMARY

In view of the above, an object of the present invention is to provide an improved roof rack load carrying bar, which at least alleviates some of the drawbacks of the prior art, or which at least provides a good alternative.

The object is provided by the subject matter in independent claim 1. Advantageous embodiments may be found in the dependent claims and in the accompanying description and drawings.

According to a first aspect thereof, the object is provided by a roof rack load carrying bar, comprising, a channel for receiving at least one mounting member for attaching a load carrying bar accessory to the load carrying bar, the channel extending at least partly in a length direction of the load carrying bar, the load carrying bar further comprising a first and a second cover extending in the length direction of the load carrying bar and being arranged for sealing the channel from an external environment, the first cover being attached to the load carrying bar via a first attachment interface provided at a first side of the channel, the second cover being attached to the load carrying bar via a second attachment interface provided at a second side of the channel, wherein the first and the second attachment interface are asymmetrical with respect to each other.

By the provision of the aforementioned load carrying bar, an improved load carrying bar is provided where the mounting procedure of the first and the second cover will be significantly facilitated. It has namely been found that it may be important to correctly mount the two covers with respect to a travel direction of the load carrying bar during use. More particularly, the respective sections of the two covers which face outwardly with respect to the load carrying bar may be designed differently for different purposes, and therefore each cover may need to be mounted correctly with respect to the travel direction. By the provision of positioning indicia in the form of different attachment interfaces for each cover, the risk of incorrect mounting of the first and the second cover is reduced. The difference between the interfaces is provided in that the first and the second attachment interface are asymmetrical with respect to each other. The user may thus be provided with visual indicia of where the cover is intended to be mounted just by looking at and comparing the attachment interfaces. In addition, the asymmetry between the first and the second attachment interfaces may also physically prevent incorrect placement of the first and the second cover on the load carrying bar.

Optionally, the first and the second attachment interface may further be asymmetrical with respect to a width direction of the load carrying bar, wherein the width direction is perpendicular to the length direction of the load carrying bar.

Optionally, the first and the second cover may be separate parts with respect to each other and configured for sealing the channel during use of the load carrying bar.

Optionally, the first and/or the second attachment interface may be configured as a female/male connection, preferably by a groove and a corresponding, i.e. a matching, protruding portion extending in the length direction of the load carrying bar. A female/male connection has been found to provide a robust connection between the bar and the respective cover, where preferably the connection is in the form of a corresponding groove/protruding portion.

Optionally, the groove may comprise a first side wall and a second side wall facing the first side wall, preferably wherein the second side wall is inclined away from the first side wall. By providing such an inclination of the second side wall a facilitated mounting procedure may be realized, also resulting in a robust connection with reduced risk of detachment of the cover from the bar. Still optionally, the second side wall may comprise a hook portion at a distal end of the second side wall, thereby further improving the connection to the load carrying bar.

Optionally, the first side wall may further comprise a hook-shaped gripping member comprising a hook portion, the hook-shaped gripping member being an extension of the first side wall with the hook portion bent from the first side wall by an angle being larger than 90 degrees with respect to the first side wall. It has been found that an even further improved connection may be provided by such configuration with the hook portion engaging in an opposing portion of the load carrying bar.

Optionally, each one of the first and the second attachment interface may be configured as a female/male connection, preferably wherein the first attachment interface comprises a first groove and a corresponding, i.e. matching, first protruding portion extending in the length direction of the load carrying bar and the second attachment interface comprises a second groove and a corresponding, i.e. matching, second protruding portion extending in the length direction of the load carrying bar. Providing female/male connections for each cover has been found to result in robust connections for both covers. Moreover, similar types of connection configurations on the respective covers, however asymmetrical, may further facilitate the mounting procedure for a user of the load carrying bar. More particularly, the mounting procedure for each cover may be performed in a similar manner, such as by a snap on connection, thereby avoiding any possible confusion for the user when connecting the covers.

Optionally, the second groove and the second protruding portion may each comprise an additional groove and protruding portion configuration extending in the length direction of the load carrying bar, thereby providing robust and asymmetrical female/male connections. The additional groove and protruding portion configuration may hence reduce the risk that a user by mistake mounts the covers to the load carrying bar in an erroneous inverted manner.

Optionally, at least one of the first and the second cover may comprise a friction reducing layer for reducing a friction between the at least one cover and the at least one mounting member. With such a friction reducing layer, the mounting member may more easily be moved in the channel, thereby providing facilitated and improved mounting procedure for the user of the load carrying bar.

Optionally, the first and/or the second cover may comprise an outer sealing surface substantially flush with an outer adjacent surface of the load carrying bar. By providing a smooth outer surface of the load carrying bar, airflow around the load carrying bar may be improved, which may result in reduced drag and/or noise.

Optionally, at least one of the first and the second cover may comprise an inner sealing surface facing the channel and sealing against the mounting member during use of the mounting member, wherein the inner sealing surface is inclined towards a side wall of the channel located on the same side as the cover comprising the inner surface. By such a configuration of the at least one cover, the sealing around the mounting member being located in the channel may be improved. In addition, it may further facilitate movement/sliding of the mounting member during the mounting procedure due to the inclined surface configuration.

Optionally, at least one of the first and the second cover may comprise an attachment portion and a sealing portion for sealing the channel from the external environment, wherein the attachment portion comprises or consist of a first material and the sealing portion comprises or consists of a second material being different from the first material. It has namely been found that it may be advantageous to provide a cover comprising different materials. Still optionally, a hardness of the first material may be higher than a hardness of the second material. More particularly, it has been found that providing increased hardness for the attachment portion may result in improved connection to the load carrying bar, whilst a lower hardness for the sealing portion may provide improved sealing performance. Purely by way of example, a hardness of the first material of the attachment portion may be in a range of 30-50 Shore D, preferably 35-45 Shore D, and more preferably 38-42 Shore D, such as 40 Shore D. Still further, purely by way of example, a hardness of the second material of the sealing portion may be in a range of 60-80 Shore A, preferably 65-75 Shore A, and more preferably 68-72 Shore A, such as 70 Shore A. Shore hardness is well-known by the skilled person and used for measuring hardness of a material, such as for polymers, elastomers and rubbers. Shore hardness may advantageously be measured by a Shore durometer and the measurement method is for example described in the standards ASTM D2240, ISO 868 and ISO 7619. Still further, increased hardness may result in increased stiffness of the attachment portion, which thereby for example may result in an improved snap on connection of the attachment portion to the load carrying bar.

Optionally, the first cover may be located in front of the second cover with respect to a travel direction of the load carrying bar during use, the first cover comprising an airflow regulating pattern extending in a length direction of the load carrying bar, the pattern comprising at least two raised rib portions relatively offset from each other in the length direction of the load carrying bar. It has namely been found that providing an airflow pattern on one of the covers comprising the asymmetrical attachment interface may further assure that the airflow pattern is mounted correctly with respect to the travel direction.

According to a second aspect thereof, the object is provided by a roof rack load carrying bar, comprising, a channel for receiving at least one mounting member for attaching a load carrying bar accessory to the load carrying bar, the channel extending at least partly in a length direction of the load carrying bar, at least a first cover extending in the length direction of the load carrying bar, the first cover comprising a first attachment portion for attaching the first cover to the load carrying bar and a first sealing portion for sealing the channel from an external environment, wherein the first attachment portion comprises or consist of a first material and the first sealing portion comprises or consist of a second material different from the first material.

By the provision of the aforementioned configuration, an improved load carrying bar is provided. It has namely been found that it may be advantageous to provide a cover with different materials. Still optionally, a hardness of the first material may be higher than a hardness of the second material. More particularly, it has been found that providing increased hardness for the attachment portion may result in improved connection to the load carrying bar, whilst a lower hardness for the sealing portion may provide improved sealing performance. Purely by way of example, a hardness of the first material of the attachment portion may be in a range of 30-50 Shore D, preferably 35-45 Shore D, and more preferably 38-42 Shore D, such as 40 Shore D. Still further, purely by way of example, a hardness of the second material of the sealing portion may be in a range of 60-80 Shore A, preferably 65-75 Shore A, and more preferably 68-72 Shore A, such as 70 Shore A. Shore hardness is well-known by the skilled person and used for measuring hardness of a material, such as for polymers, elastomers and rubbers. Shore hardness may advantageously be measured by a Shore durometer and the measurement method is for example described in the standards ASTM D2240, ISO 868 and ISO 7619. According to an example embodiment of the present disclosure, the at least first cover may comprise or consist of rubber, a polymer or an elastomer, or a combination thereof.

It shall be noted that all embodiments of the second aspect of the present disclosure are applicable to all of the embodiments of the first aspect of the present disclosure and vice versa.

Optionally, the load carrying bar may comprise a second cover extending in the length direction of the load carrying bar, the second cover comprising a second attachment portion for attaching the second cover to the load carrying bar and a second sealing portion for sealing the channel from an external environment, wherein the second attachment portion comprises or consist of a third material and the second sealing portion comprises or consist of a fourth material different from the third material. Purely by way of example, a hardness of the third material of the second attachment portion may be in a range of 30-50 Shore D, preferably 35-45 Shore D, and more preferably 38-42 Shore D, such as 40 Shore D. Still further, purely by way of example, a hardness of the third material of the second sealing portion may be in a range of 60-80 Shore A, preferably 65-75 Shore A, and more preferably 68-72 Shore A, such as 70 Shore A. Still optionally, the first and the second cover may be configured similarly with similar materials, i.e. the first material may be the same as, or similar to, the third material and the second material may be the same as, or similar to, the fourth material. By "similar" herein is meant materials having similar hardness properties. Still further, the hardness of the first material may be similar to the hardness of the third material and the hardness of the second material may be similar to the hardness of the fourth material. Consequently, according to an example embodiment of the present disclosure, also the second cover may comprise or consist of rubber, a polymer or an elastomer, or a combination thereof.

Optionally, the first attachment portion and the second attachment portion may be asymmetrical with respect to each other, preferably with the asymmetry provided in a width direction of the load carrying bar, the width direction being perpendicular to the length direction.

Optionally, at least one of the first and the second attachment portions may be configured as a snap on attachment portion. Providing at least one of the covers with a snap on attachment portion may further facilitate the mounting procedure for a user of the load carrying bar. Still further, purely by way of example, the snap on functionality combined with a relatively stiff attachment portion may further improve the robustness of the connection between the cover(s) and the load carrying bar, thus preventing partial or complete detachment of the cover from the load carrying bar. It may also prevent lateral displacement of the cover which could otherwise render the sliding of a mounting member along the first cover or between the first and the second cover during mounting.

Optionally, at least one of the first and the second attachment portion may be configured as a groove or a protruding portion extending in the length direction of the load carrying bar.

Optionally, the first and/or the second attachment portion may be configured as a groove, the groove comprising a first side wall and a second side wall facing the first side wall, preferably wherein the second side wall is inclined away from the first side wall. By providing such an inclination of the second side wall a facilitated mounting procedure may be accomplished, also resulting in a robust connection. Still optionally, the second side wall may comprise a hook portion at a distal end of the second side wall, thereby further improving the connection to the load carrying bar.

Optionally, the first side wall may further comprise a hook-shaped gripping member comprising a hook portion, the hook-shaped gripping member being an extension of the first side wall with the hook portion bent from the first side wall by an angle being larger than 90 degrees with respect to the first side wall. It has been found that an even further improved connection may be provided by such configuration, by means of the hook portion engaging in an opposing portion of the load carrying bar.

Optionally, at least one of the first and the second cover may comprise an outer sealing surface substantially flush with an outer adjacent surface of the load carrying bar. By providing a smooth outer surface of the load carrying bar, airflow around the load carrying bar may be improved, resulting in reduced drag and/or noise.

Optionally, at least one of the first and the second cover may comprise an inner sealing surface facing the channel and sealing against the mounting member during use of the mounting member, wherein the inner sealing surface is inclined towards a side wall of the channel being located on the same side as the cover comprising the inner surface. By such a configuration of the at least one cover, the sealing around the mounting member being located in the channel may be improved. In addition, it may further facilitate movement/sliding of the mounting member during the mounting procedure, since a smaller surface area of the cover may be in contact with the mounting member due to this configuration of the cover.

Optionally, at least one of the first and the second cover may comprise a friction reducing layer for reducing a friction between the at least one cover and the at least one mounting member. With such a friction reducing layer, the mounting member may more easily be moved in the channel, thereby providing facilitated and improved mounting procedure for the user of the load carrying bar. The friction reducing layer may for example be provided as an additional material on the first and/or the second cover. Purely by way of example, a hardness of the friction reducing layer may be in the range of 40-60 Shore D, preferably 45-55 Shore D, such as 50 Shore D.

Optionally, the load carrying bar may comprise an airflow regulating pattern extending in a length direction of the load carrying bar, the pattern comprising at least two raised rib portions relatively offset from each other in the length direction of the load carrying bar. Still optionally, the airflow regulating pattern may be provided on at least one of the first and second cover.

According to a third aspect thereof, the object is provided by a roof rack load carrying bar, comprising, a channel for receiving at least one mounting member for attaching a load carrying bar accessory to the load carrying bar, the channel extending at least partly in a length direction of the load carrying bar, at least a first cover extending in the length direction for sealing the channel from an external environment, the first cover comprising an attachment portion, the attachment portion comprising a groove extending in the length direction attaching the first cover to a corresponding protruding portion extending in the length direction on the load carrying bar, the groove comprising a first and a second side wall, wherein the attachment portion further comprising a hook-shaped gripping member comprising a hook portion, the hook-shaped gripping member being an extension of the first side wall with the hook portion bent from the first side wall by an angle being larger than 90 degrees with respect to the first side wall.

By the provision of the aforementioned load carrying bar, the connection of the at least first cover may be improved. More particularly, a more robust connection may be provided where the hook-shaped gripping member may reduce the likelihood that the at least first cover is released during use of the load carrying bar. It has namely been found that providing a hook-shaped gripping member with the hook portion as defined herein, a counter force preventing the at least first cover from being released from its connection during use, may be increased. More particularly, if the load carrying bar is being used on a vehicle running at high speed, the force acting on the at least first cover as a consequence of the airflow may cause the at least first cover to loosen from the bar. By the use of the hook-shaped gripping member, unwanted release/loosening of the at least first cover may be avoided.

It shall be noted that all embodiments of the third aspect of the present disclosure are applicable to all of the embodiments of the first and the second aspects of the present disclosure and vice versa.

Optionally, the hook portion may be bent from the first side wall by an angle being larger than any one of 100, 110, 120, 130, 140 and 150 degrees with respect to the first side wall.

Optionally, the hook portion may be bent outwardly from the groove. Still optionally, the hook portion may be bent inwardly into the groove.

Optionally, the hook portion may be arranged to snap into a corresponding receiving portion on the load carrying bar for locking the at least first cover to the load carrying bar.

Optionally, the first side wall may extend substantially perpendicularly out from an upper surface of the at least one first cover. The upper surface is oriented upwardly with respect to a height direction of the load carrying bar, the height direction being perpendicular to the length and the width direction.

Optionally, the second side wall may face the first side wall, and wherein the second side wall is inclined away from the first side wall.

Optionally, the second side wall may comprise a hook portion at an outer end of the second side wall.

According to a fourth aspect thereof, the object is provided by a roof rack load carrying bar, comprising, an airflow regulating pattern extending in a length direction of the load carrying bar, the pattern comprising at least two raised rib portions relatively offset from each other in the length direction of the load carrying bar, wherein each one of the at least two raised rib portions is diagonally arranged with respect to a travel direction of the load carrying bar during use and further has a portion width measured in the length direction of the load carrying bar, wherein two adjacent raised rib portions are separated by a separation distance in the length direction of the load carrying bar, wherein the separation distance is at least two times greater than the portion width of at least one of the adjacent raised rib portions.

By the provision of the aforementioned load carrying bar, an improved load carrying bar is provided where improved airflow around the load carrying bar may be provided, which may result in reduced/improved noise and/or drag.

It shall be noted that all embodiments of the fourth aspect of the present disclosure are applicable to all of the embodiments of the first, second and third aspects of the present disclosure and vice versa.

Optionally, the pattern may extend along at least 80% of a load carrying bar length in the length direction. Thereby, the improved airflow may be provided along the substantial length of the load carrying bar. Still optionally, the pattern may be disrupted with respect to the length direction of the load carrying bar. For example, the pattern may extend from both sides of the bar, but not in a section there-between. For example, if a roof box is mounted onto the load carrying bar, there may be no need of the airflow pattern where the roof box is located on the bar and the pattern may be arranged only at the respective end portions of the load carrying bar, as seen in a longitudinal direction, with each end portion being 15-30% of the total length of the load carrying bar. However, in a preferred embodiment, the pattern extends over a substantial portion of the length of the load carrying bar, such as along at least 80% of the length.

Optionally, the pattern may be a continuous reoccurring pattern in the length direction of the load carrying bar, preferably with at least 10, 15, 20, 25, 30, 35, 40 raised rib portions.

Optionally, at least one of the at least two raised rib portions may be a V-shaped rib portion with a tip of the V-shape pointing in the travel direction. It has been found that providing such a shape of the rib portions may be advantageous for the airflow around the load carrying bar.

Optionally, the load carrying bar may further comprise a channel for receiving at least one mounting member for attaching a load carrying bar accessory to the load carrying bar, the channel extending at least partly in a length direction of the load carrying bar, wherein the pattern is at least partly located in front of the channel with respect to the travel direction. It has been found that providing an airflow patter as disclosed herein in front of such a channel may further improve the airflow around the load carrying bar, in particular close to the channel. Preferably, the pattern may be provided during an extrusion process of the load carrying bar. The load carrying bar as disclosed herein for all embodiments of the different aspects of the disclosure may preferably be made in aluminium, or any similar light-weight metal or metal alloy.

Optionally, the load carrying bar may further comprise at least a first cover extending in the length direction for sealing the channel from an external environment, wherein the pattern is located on the first cover. This may further improve the airflow, and also it has been found advantageous to provide the pattern on the at least first cover for facilitating manufacturing of the load carrying bar. For example, the at least first cover as disclosed herein may advantageously be manufactured in an extrusion process, where the airflow pattern may be provided to the at least first cover during or directly after the extrusion procedure.

Optionally, the portion width of at least one of the adjacent raised rib portions may be from 0.5 to 3 millimeters (mm), preferably 0.7-2.5 mm, more preferably 0.7-2 mm, such as 0.8-1.2 mm.

If the pattern is a continuous reoccurring pattern in the length direction of the load carrying bar, preferably with at least 10, 15, 20, 25, 30, 35, 40 raised rib portions, the portion width of each one of the plurality of adjacent raised rib portions may be from 0.5 to 3 mm, preferably 0.7-2.5 mm, more preferably 0.7-2 mm, such as 0.8-1.2 mm.

Optionally, at least one of the at least two rib portions may have a rib height from 0.3 to 2 mm, preferably 0.5-2 mm, such as 0.5-1 mm.

If the pattern is a continuous reoccurring pattern in the length direction of the load carrying bar, preferably with at least 10, 15, 20, 25, 30, 35, 40 raised rib portions, a plurality of the rib portions have a rib height from 0.3 to 2 mm, preferably 0.5-2 mm, such as 0.5-1 mm.

Optionally, the separation distance may be from 4 to 25 mm, more preferably 10-25 mm, such as 10-20 mm.

Optionally, at least one of the at least two raised rib portions may be configured as a distinct raised rib portion with an angle between a surface onto which the at least one rib portion is located and a side wall of the rib portion which is at least 90 degrees, such as from 90 to 120 degrees. Preferably, a side wall of the at least one raised rib portion which faces the travel direction of the load carrying bar during use may have such an angle, which is preferably larger than 90 degrees. Thereby, the airflow may be further improved. Still optionally, if the pattern is a continuous reoccurring pattern in the length direction of the load carrying bar, preferably with at least 10, 15, 20, 25, 30, 35, 40 raised rib portions, the at least 10, 15, 20, 25, 30, 35, 40 raised rib portions may be configured as distinct raised rib portions with each rib portion having an angle between a surface onto which the rib portion is located and a side wall of the rib portion which is at least 90 degrees, such as from 90 to 120 degrees or 90-140 degrees.

Optionally, the surface onto which the at least one rib portion is located is substantially planar. Providing distinct raised rib portions on a substantially planar surface has shown to result in an improved airflow for the load carrying bar.

Optionally, the separation distance may be at least 3, 4, 5, 6, 7, 8, 9 or 10 times greater than the portion width of at least one of the adjacent raised rib portions. Providing a relatively large separation distance with respect to the portion width of at least one of, or each one of, the adjacent raised rib portions may further improve airflow around the load carrying bar. It has namely been found that drag and/or noise may be reduced by such configuration.

According to a fifth aspect thereof, the object is provided by a roof rack load carrying bar, comprising, a cross sectional profile having a front bar portion and a rear bar portion with respect to a travel direction of the load carrying bar during use, the front bar portion having a front edge, the rear bar portion having a profile tapering rearwards with respect to the travel direction and towards a rear edge of the rear bar portion, the front edge comprising a first curved-shaped profile extending from an upper portion to a lower portion of the front bar portion, wherein at least one of the first curved-shaped profile and the rear edge having a first distinct angular shift.

By the provision of the aforementioned load carrying bar, an improved load carrying bar is provided where an improved airflow around the load carrying bar may be provided. It has namely been found that providing distinct angular shift(s) at certain location(s) of the load carrying bar may further improve the airflow.

It shall be noted that all embodiments of the fifth aspect of the present disclosure are applicable to all of the embodiments of the first, second, third and fourth aspects of the present disclosure and vice versa.

Optionally, the first curved-shaped profile has the first distinct angular shift at a very front portion of the front edge. The very front portion may be defined as the portion of the load carrying bar being located furthest to the front of the load carrying bar with respect to the width and the travel direction during use of the load carrying bar.

Optionally, the first curved-shaped profile may further have a second distinct angular shift approximately half-way up from the very front portion with respect to the upper portion of the front bar portion.

Optionally, the cross sectional profile may be a wing-shaped profile.

Optionally, at least one angular shift may be from 5 to 60 degrees, preferably from 10 to 30 degrees, such as 10-20 degrees.

BRIEF DESCRIPTION OF THE DRAWINGS

With reference to the appended drawings, below follows a more detailed description of embodiments of the invention cited as examples.

In the drawings:

FIG. 1 depicts a cross sectional profile of a load carrying bar according to the prior art;

FIG. 2 depicts a perspective view of a load carrying bar according to an example embodiment of the present invention;

Figure 3:
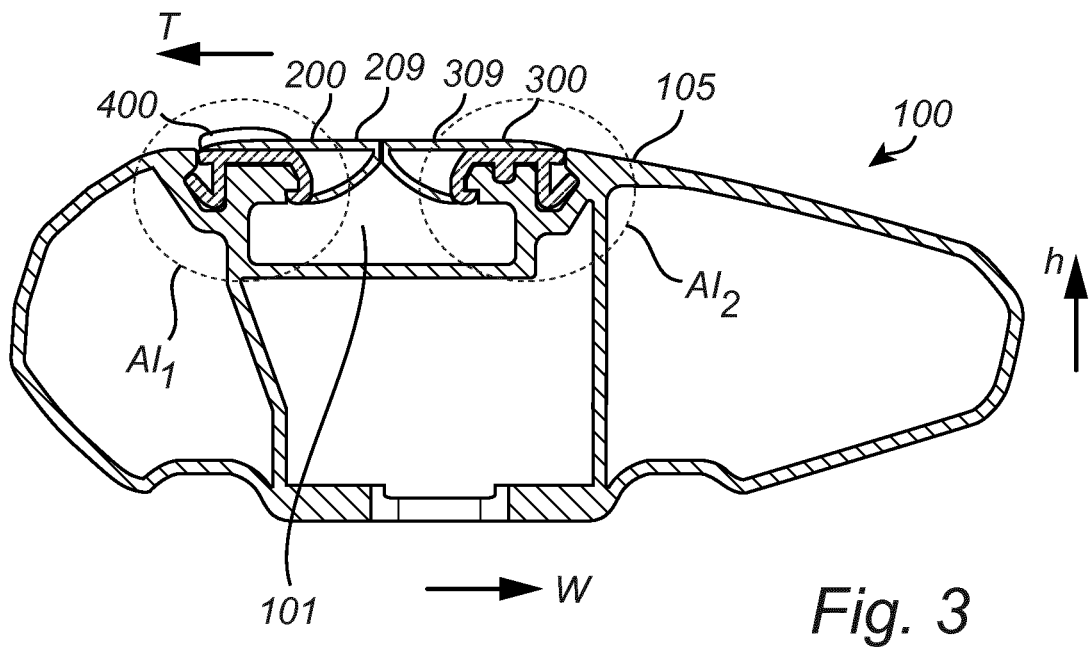
FIG. 3 depicts a cross sectional view of a load carrying bar according to an example embodiment of the present invention.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Like reference characters refer to like elements throughout the description, unless expressed otherwise.

DETAILED DESCRIPTION OF EXAMPLE EMBODIMENTS OF THE INVENTION

FIG. 1 depicts a cross sectional view of a load carrying bar 1 according to the prior art. The load carrying bar 1 comprises a channel which opening is covered by two covers, 2 and 3 respectively. As can be seen, the two covers 2 and 3 are attached to the load carrying bar 1 via respective grooves provided on side surfaces defining the opening and facing each other, thereby sealing the channel.

Now, with reference to FIGS. 2-10, example embodiments of the present invention will be described in more detail. In FIG. 2, a perspective view of a load carrying bar 100 according to an example embodiment of the present invention is depicted. The load carrying bar 100 comprises a channel 101 for receiving at least one mounting member, the mounting member being shown in FIG. 9 as ref. 10, for attaching a load carrying bar accessory (not shown) to the load carrying bar 100. The channel 101 extends in a length direction L of the load carrying bar 100. Moreover, the load carrying bar 100 comprises a first 200 and a second 300 cover which extends in the length direction L of the load carrying bar 100 and which is arranged for sealing the channel 101 from an external environment. The first cover 200 is attached to the load carrying bar 100 via a first attachment interface $AI_1$, see e.g. FIG. 4, provided at a first side of the channel 101, and the second cover 300 is attached to the load carrying bar 100 via a second attachment interface $AI_2$, see FIG. 4, provided at a second side of the channel 101. The first and the second sides of the channel 101 are oriented with respect to a width direction w of the load carrying bar 100. Moreover, as can be seen in for example FIGS. 3 and 4, the first and the second attachment interfaces, $AI_1$ and $AI_2$, are asymmetrical with respect to each other.

Moreover, in the embodiment shown in FIG. 2, an airflow regulating pattern 400 according to an example embodiment of the fourth aspect of the present invention is depicted. In this particular embodiment, the pattern 400 comprises a plurality of V-shaped raised rib portions, whereby the tip of the V-shapes are oriented and pointing in the travel direction T of the load carrying bar during use. Moreover, as can be seen, the airflow pattern 400 extends along a substantial portion of the total length $L_{10}$ of the load carrying bar 100, and is also located on the first cover 200. However, it shall be noted that the pattern 400 may be located in other places, such as directly on the surface of the load carrying bar 100, however preferably in front of, or close to, or above, the channel 101 with respect to the travel direction T.

Figure 4:
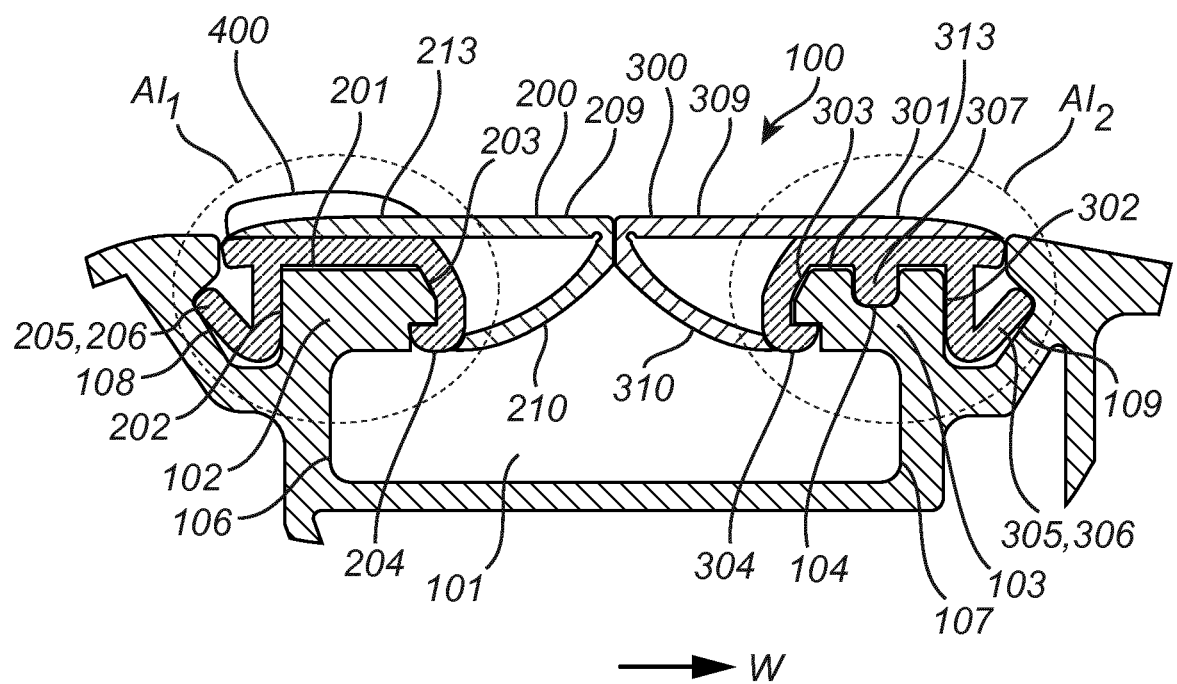
FIG. 4 depicts another cross sectional view of a portion of a load carrying bar according to an example embodiment of the present invention.

In FIG. 3, a cross sectional view of the load carrying bar 100 as seen in FIG. 2 is depicted. The airflow regulating pattern 400, here provided on the first cover 200, can be seen. Moreover the asymmetrical attachment interfaces $AI_1$ and $AI_2$ are also shown, with an enlarged view in FIG. 4. The load carrying bar 100 has a height direction h and the width direction w, wherein the height direction h, width direction w and the length direction L are perpendicular with respect to each other, resulting in a three-dimensional space. The first and the second cover, 200 and 300, comprises respective outer surfaces, 209 and 309 respectively, wherein the outer surface 309 of the second cover 300 is substantially flush with the outer surface 105 of the load carrying bar 100. The outer surface 209 of the first cover 200 is also substantially flush with the outer surface 105. However, the airflow pattern 400 extends out from the outer surface 209. By this configuration, a more integrated and smooth design is provided, which in turn may result in improved airflow around the load carrying bar 100.

FIG. 4 depicts an enlarged view of the channel 101, the first and the second cover, 200 and 300, and the asymmetrical attachment interfaces, $AI_1$ and $AI_2$, of the load carrying bar 100. The first and the second attachment interfaces, $AI_1$ and $AI_2$, are asymmetrical with respect to the width direction w of the load carrying bar 100. Moreover, the first and the second cover, 200 and 300, are separate parts with respect to each other and configured for sealing the channel 101 during use of the load carrying bar 100. In particular, the covers 200 and 300 seal an opening of the channel 101, oriented upwardly and extending in the length direction L. The first and the second attachment interface, $AI_1$ and $AI_2$, are configured as respective female/male connections. In this particular embodiment, the first cover 200 comprises a first groove 201 and a corresponding, i.e. matching, first protruding portion 102 extending in the length direction L of the load carrying bar 100. Moreover, the second cover 300 comprises a second groove 301 and a corresponding, i.e. matching, second protruding portion 103 extending in the length direction L of the load carrying bar 100. It shall be noted that the present invention is not limited to this type of female/male configuration, but an inverted female/male connection may also be used, i.e. by e.g. providing grooves on the load carrying bar 100 and protruding portions on the covers, 200 and 300.

The first groove 201 further comprises a first side wall 202 and a second side wall 203 which faces the first side wall 202, and the second side wall 203 is here also inclined away from the first side wall 202. This configuration may facilitate to accomplish a snap on functionality for attaching the first cover 200 to the first protruding portion 102. Similarly, the second groove 301 further comprises a first side wall 302 and a second side wall 303 which faces the first side wall 302, and the second side wall 303 is in a similar manner inclined away from the first side wall 302 of the second cover 300.

The second side wall 203 of the first cover 200 also comprises a hook portion 204 at a distal end of the second side wall 203. The hook portion 204 is bent inwardly towards the first groove 201, thereby providing a locking mechanism for locking the first cover 200 to the load carrying bar 100. Similarly, the second side wall 303 of the second cover 300 also comprises a hook portion 304 at a distal end of the second side wall 303. The hook portion 304 is bent inwardly towards the second groove 301, thereby providing a similar locking mechanism for locking the second cover 300 to the load carrying bar 100.

Moreover, in this particular embodiment, in order to further improve the robustness of the connection of the respective covers, 200 and 300, to the load carrying bar 100, a further locking mechanism, 205 and 305, is provided on the respective first and second cover, 200 and 300. More particularly, the first side wall 202 of the first cover 200 further comprises a hook-shaped gripping member 205 which comprises a hook portion 206, wherein the hook-shaped gripping member 205 is an extension of the first side wall 202 of the first cover 200 with the hook portion 206 bent from the first side wall 202 by an angle being larger than 90 degrees with respect to the first side wall 202. As can be seen in this example embodiment, the hook portion 206 is bent by an angle being larger than 90 degrees. Still further, the hook portion 206 is arranged to snap into a corresponding receiving portion 108 on the load carrying bar 100, which is configured as a matching inclined surface for the hook portion 206, for locking the first cover 200 to the load carrying bar 100. By this configuration, an improved locking of the first cover 200 is provided. In a similar manner, the first side wall 302 of the second cover 300 further comprises a hook-shaped gripping member 305 which comprises a hook portion 306, wherein the hook-shaped gripping member 305 is an extension of the first side wall 302 of the second cover 300 with the hook portion 306 bent from the first side wall 302 by an angle being larger than 90 degrees with respect to the first side wall 302. As can be seen in this example embodiment, the hook portion 306 is bent by an angle being larger than 90 degrees. Still further, the hook portion 306 is arranged to snap into a corresponding receiving portion 109 on the load carrying bar 100, which is configured as a matching inclined surface for the hook portion 306, for locking the second cover 300 to the load carrying bar 100. By this configuration, an improved locking is also provided for the second cover 300. Both these hook portions, 206 and 306, are bent outwardly with respect to the respective grooves, 201 and 301, of the respective first and second cover, 200 and 300. It shall however be noted that a similar improved locking function may also be provided by configuring the hook portions inwardly towards the respective grooves, 201 and 301, instead. However, configuring the hook portions 206 and 306 outwardly has been found advantageous in that it provides for improved connection and also may be beneficial for manufacturing purposes. Moreover, the first side wall 202 of the first cover 200 extends substantially perpendicularly out from an upper surface 213 of the first cover 200. In a similar manner, the first side wall 302 of the second cover 300 extends substantially perpendicularly out from an upper surface 313 of the second cover 300.

Still further, in this example embodiment, the second groove 301 and the second protruding portion 103 comprises an additional groove and protruding portion configuration, 104 and 307, which extends in the length direction L of the load carrying bar 100. More particularly, the second groove 301 comprises a protruding portion 307 located inside the second groove 301, and the second protruding portion 103 comprises a matching groove 104 located on the protruding portion 103. The first groove 201 and the first protruding portion 102 of the first attachment interface $AI_1$ do not present such an additional groove/protrusion configuration, thereby resulting in that the first and the second attachment interface, $AI_1$ and $AI_2$, are asymmetrical with respect to each other. It shall however be understood that the asymmetry may be provided in many different ways without departing from the scope of the present invention. For example, the additional groove/protruding portion could likewise be located on the first cover 200. In addition, an inverted groove/protruding portion configuration could also be used.

Figure 9:
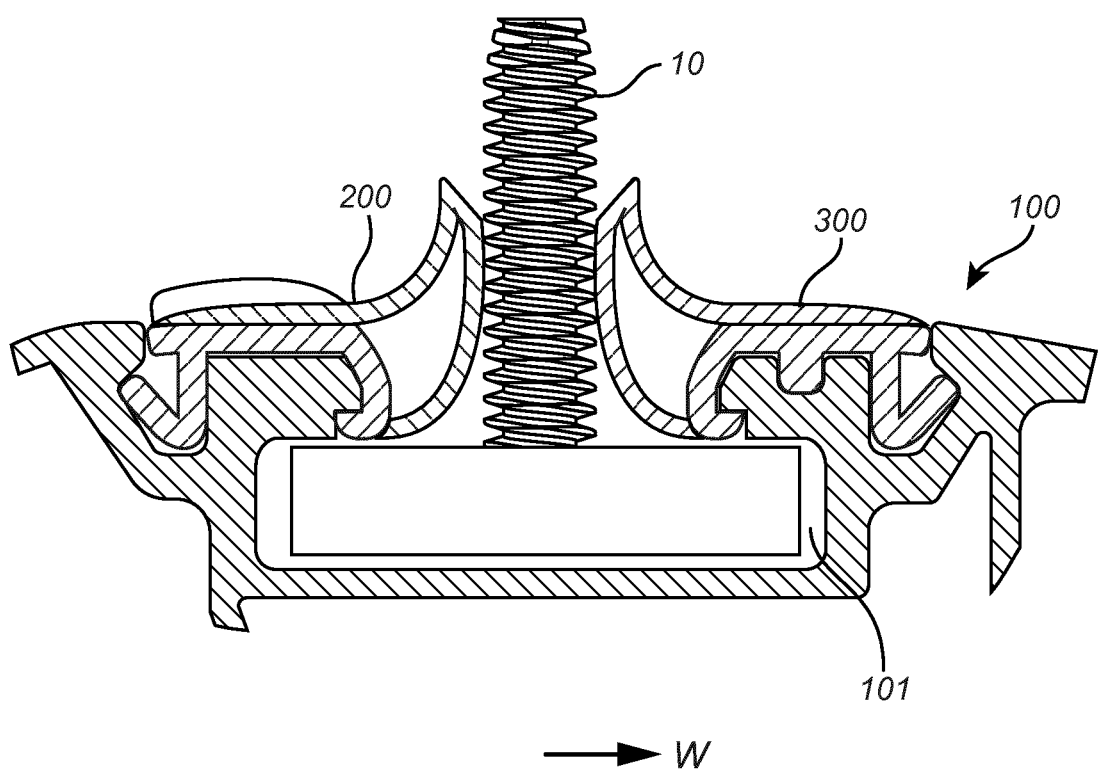
FIG. 9 depicts a cross sectional view of a portion of a load carrying bar according to an example embodiment of the present invention, where a mounting member is placed in the channel.

Moreover, the first cover 200 comprises an inner sealing surface 210 which faces the channel 101, wherein the inner sealing surface 210 of the first cover 200 is inclined towards a side wall 106 of the channel 101 located on the same side as the first cover 200. In a similar manner, the second cover 300 comprises an inner sealing surface 310 which faces the channel 101, wherein the inner sealing surface 310 of the second cover 300 is inclined towards a side wall 107 of the channel 101 located on the same side as the second cover 300. Thereby, the mounting member 10, as seen in FIG. 9 may be easier to move/displace in the length direction L of the channel 101, whilst still providing a good sealing performance for the channel 101.

Figure 5A:
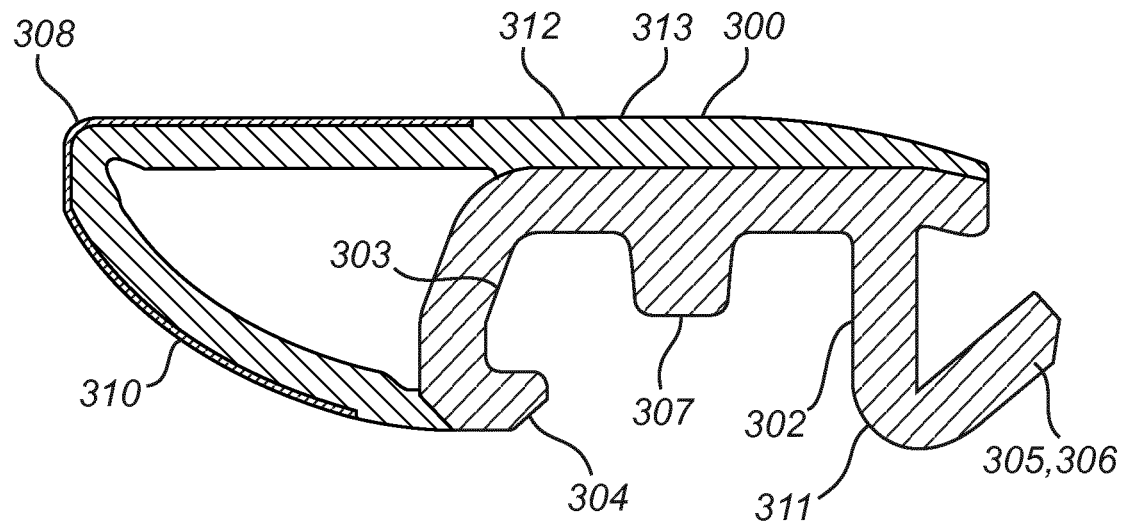
FIGS. 5a and 5b depicts cross sectional views of a first and a second cover according to example embodiments of the present invention.
Figure 5B:
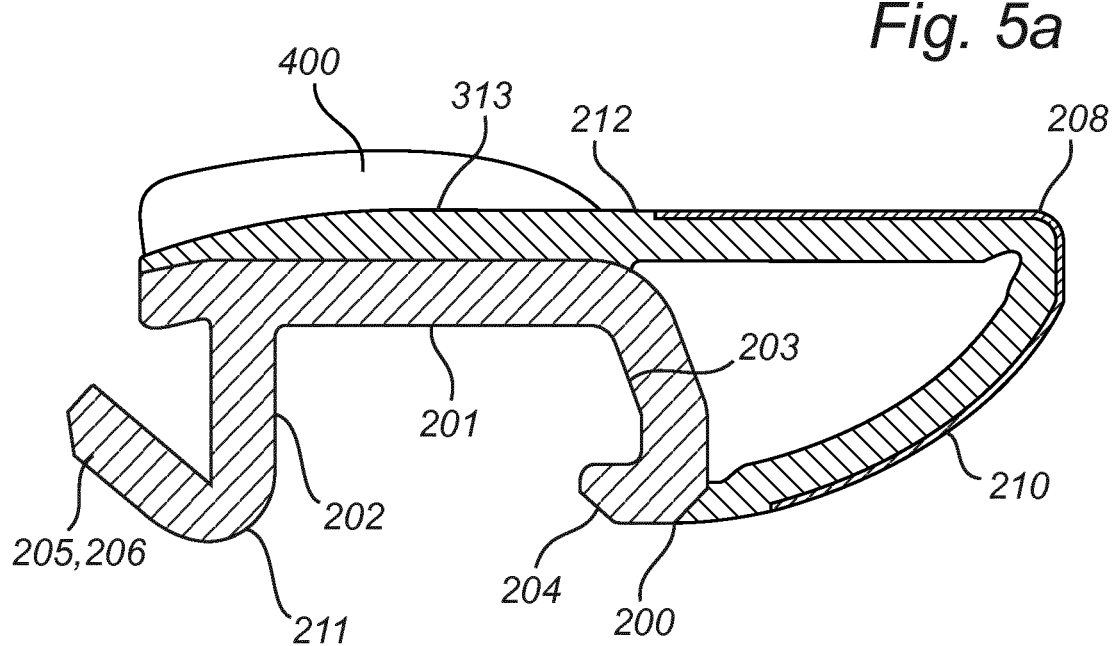

Now turning to FIGS. 5a and 5b, the first and the second cover, 200 and 300, can be seen when separated from the load carrying bar 100, with the first cover 200 being illustrated in FIG. 5b and the second cover 300 being illustrated in FIG. 5a. The first cover 200 cover comprises a friction reducing layer 208 for reducing a friction between the first cover 200 and the at least one mounting member 10, as seen in FIG. 9. In a similar manner, the second cover 300 cover comprises a friction reducing layer 308 for reducing a friction between the second cover 300 and the at least one mounting member 10, as seen in FIG. 9. The friction reducing layers, 208 and 308 may for example be provided as coatings on the sealing portions, 212 and 312, of the first and the second cover, 200 and 300. Moreover, the friction reducing layer may be provided by performing a treatment on the sealing portions, 212, 312, such as heat treatment and/or chemical treatment. Purely by way of example, the friction reducing layers, 208 and/or 308, may be from 0.05-0.2 mm thick, such as 0.1 mm. More particularly, in this example embodiment, the first cover 200 comprises an attachment portion 211 and the sealing portion 212 for sealing the channel 101 from the external environment, wherein the attachment portion 211 comprises or consists of a first material and the sealing portion 212 comprises or consists of a second material different from the first material. Here, a hardness of the first material is higher than a hardness of the second material. In a similar manner, the second cover 300 comprises an attachment portion 311 and the sealing portion 312 for sealing the channel 101 from the external environment, wherein the attachment portion 311 comprises or consists of a third material and the sealing portion 212 comprises or consists of a fourth material different from the third material. Also here, a hardness of the third material is higher than a hardness of the fourth material. It has namely been found that it may be advantageous to provide different materials, and in particular different hardness, between the sealing portions and the attachment portions. For example, the attachment portions, 211 and 311, may benefit from being stiffer in that the connection may be improved. In addition, the sealing portions, 212 and 312, may benefit from being relatively less stiff, thereby improving its sealing performance, especially when there is a mounting member 10 in the channel 101.

Figure 6:
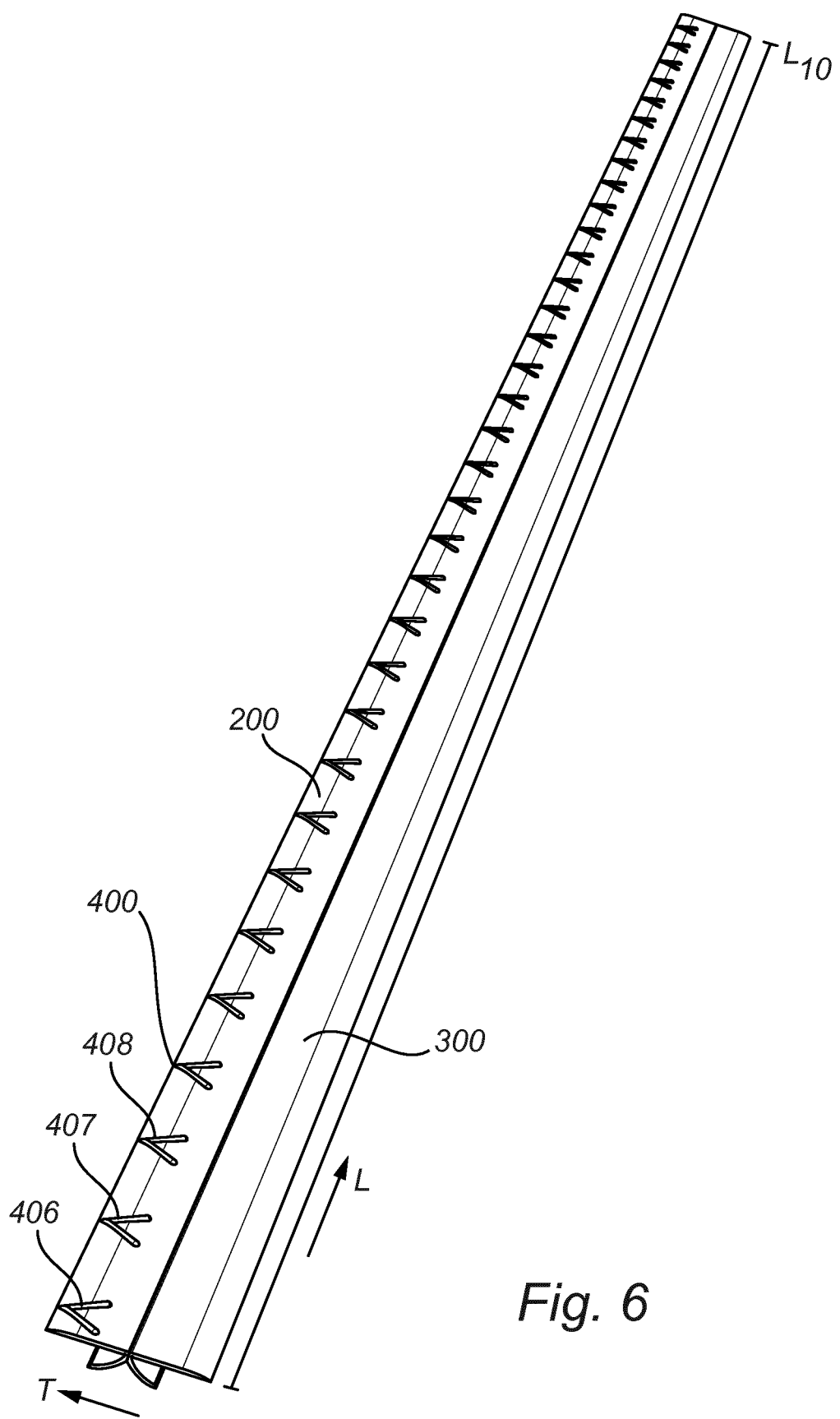
FIG. 6 depicts a perspective view of a first and a second cover according to an example embodiment of the present invention.

In FIG. 6, the first and the second cover, 200 and 300, are depicted, where a more detailed illustration of an airflow pattern 400 according to an example embodiment of the present invention also can be seen. In this example, the airflow pattern 400 is placed on the first cover 200, and configured by V-shaped raised rib portions, 406-408, extending in the length direction L as a reoccurring pattern. The tips of the V-shaped raised rib portions, 406-408, are oriented and pointing in the travel direction T of the load carrying bar 100 during use. In this embodiment, the pattern 400 extends along the complete length $L_{10}$ of the load carrying bar 100.

Figure 7:
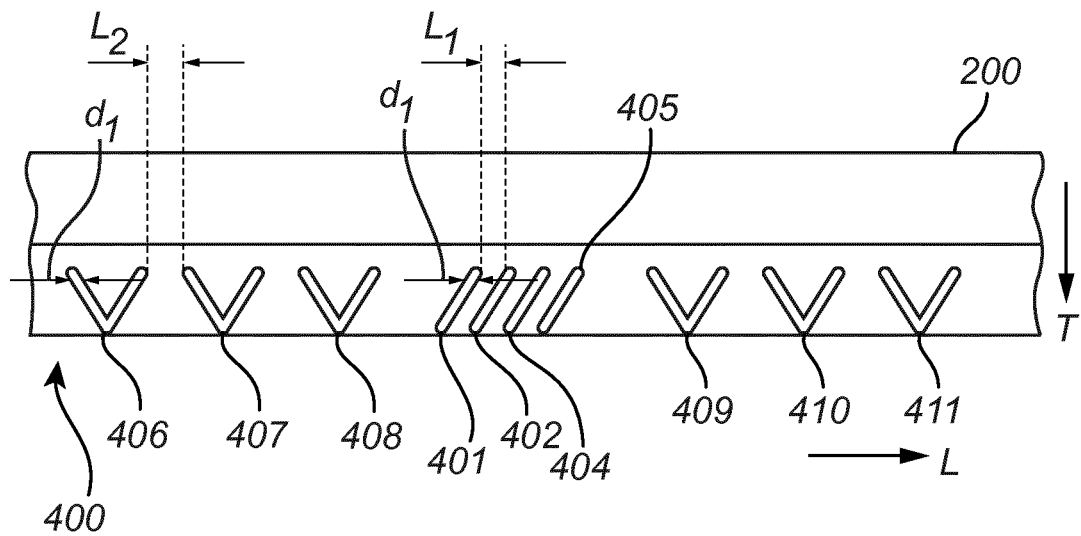
FIG. 7 depicts a schematic illustration of an airflow pattern according to an example embodiment of the present invention.
Figure 8:
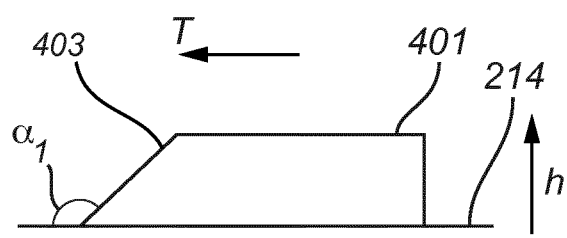
FIG. 8 depicts a schematic illustration of a raised rib portion according to an example embodiment of the present invention.

In FIGS. 7 and 8, more detailed illustrations of the airflow pattern 400 and its raised rib portions can be seen. Different types of raised rib portions are shown, i.e. V-shaped, 406-408 and 409-411, and straight I-shaped rib portions, 401, 402 and 404, oriented diagonally with respect to the travel direction T. The illustration in FIG. 7 shows a reoccurring pattern 400 with a combination of V-shaped and straight rib portions. In alternative embodiments, only one type of rib portions is used, such as only V-shaped or straight I-shaped shaped portions. Purely by way of example, any one, or each one of the raised rib portions, may be diagonally arranged by an angle of 10-50 degrees with respect to the travel direction T, preferably 20-50 degrees or 30-50 degrees, such as 45 degrees.

The airflow regulating pattern 400 extends in a length direction L of the load carrying bar 100, and the pattern 400 comprises a plurality of raised rib portions, 401, 402, 404, 406-408 and 409-410, which are relatively offset from each other in the length direction L of the load carrying bar 100, wherein each one of the at least two raised rib portions is diagonally arranged with respect to the travel direction T of the load carrying bar 100 during use. Moreover, each rib portion has a portion width d1 measured in the length direction L of the load carrying bar 100, wherein two adjacent raised rib portions, e.g. 401 and 402, and 406 and 407, are separated by a separation distance $L_1$ and $L_2$ in the length direction L of the load carrying bar 100. The separation distance $L_1$ is at least two times greater than the portion width d1 of the raised rib portion 401, and the separation distance $L_2$ is at least two times greater than the portion width d1 raised rib portion 406. The portion width d1 of at least one of the adjacent raised rib portions is from 0.5 to 3 mm, preferably 0.7-2.5 mm, more preferably 0.7-2 mm, such as 0.8-1.2 mm.

In FIG. 8, a raised rib portion 401 is depicted, shown from the side. The rib portion 401 may have a rib height 0.3 to 2 millimeters, preferably 0.5-2 mm, such as 0.5-1 mm. Moreover, it can also be seen that the rib portion is configured as a distinct raised rib portion with an angle $\alpha_1$ between a surface 214 onto which the at least one rib portion 401 is located and a side wall 403 of the rib portion which is more than 90 degrees, such as from 90 to 120 degrees or 90-140 degrees. In this example the surface 403 is oriented in the front of the rib portion with respect to the travel direction T. Any one of the rib portion's side surfaces may be configured in a similar manner, thereby providing a distinct rib portion, as seen with respect to the surface 214 onto which the at least one rib portion is located.

In FIG. 9, the load carrying bar 100 is shown when a mounting member 10, in this embodiment a screw, is placed in the channel 101. The screw comprises a screw head located in the channel 101. Hence, the channel 101 may be regarded as a T-shaped channel, or alternatively a T-track. The screw 10 can be used for attaching a load carrying bar accessory, such as a roof box, bike carrier or anything else that can be mounted onto the load carrying bar.

It shall be noted that the load carrying bar 100 as depicted herein may also advantageously be mounted to or be integrated with a roof basket, or any other load carrying arrangement intended to be provided on a vehicle, preferably on a roof of a vehicle.

Figure 10:
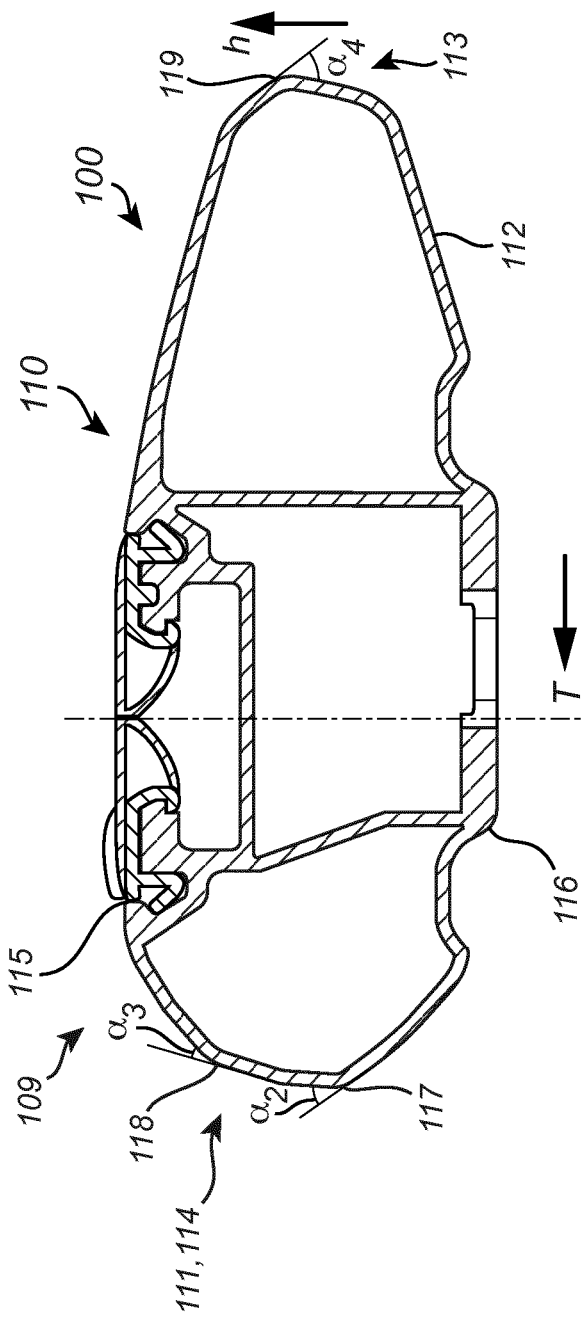
FIG. 10 depicts a cross sectional view of a load carrying bar according to an example embodiment of the present invention.

FIG. 10 depicts another cross sectional view of a load carrying bar 100 according to an example embodiment of the present invention. The load carrying bar 100 comprises a cross sectional profile having a front bar portion 109 and a rear bar portion 110 with respect to a travel direction T of the load carrying bar 100 during use. The front bar portion 109 has a front edge 111, the rear bar portion 110 has a profile 112 which tapers rearwards with respect to the travel direction T and towards a rear edge 113 of the rear bar portion 110. The front edge 111 comprises a first curved-shaped profile 114 which extends from an upper portion 115 to a lower portion 116 of the front bar portion 109. The upper portion 115 is here the utmost portion of the load carrying bar 100 with respect to the height direction h, when excluding the covers 200 and 300, and the lower portion 116 is here the lowest portion of the load carrying bar 100 with respect to the height direction h. The first curved-shaped profile 114 has a first distinct angular shift 117 at a very front portion of the front edge 111. Moreover, the first curved-shaped profile 114 further has a second distinct angular shift 118 approximately half-way up from the very front portion 117 with respect to the upper portion 115 of the front bar portion 109. In an example embodiment, a distance between the first angular shift 117 and the second angular shift 118 is from 5-25 mm, such as 10-20 mm, or 15-20 mm. As can be further seen, the cross sectional profile is here a wing-shaped profile. The width of the load carrying bar 100 is therefore at least 2 times greater than the height of the load carrying bar 100, such as at least 2.5 or 3 times greater. The distinct angular shifts, 117, 118 and 119, are here from 5-60 degrees, more particularly from 10 to 30 degrees. The angles are here indicated by the references $\alpha_2$, $\alpha_3$ and $\alpha_4$, respectively. Purely by way of example, $\alpha_2$ may be from 10 to 30 degrees, as may be from 5-30 degrees, such as 5-20 degrees, and $\alpha_4$ may be from 10 to 60 degrees, such as 30-60 degrees. As can be seen, a distinct angular shift means herein that the outer shape of the profile of the bar is interrupted such that an edge appears on the outer profile. The edge may be sharp, but it may also be a more smoothly shaped edge. The distinct angular shift is an interruption of the otherwise smooth continuing surface extending around the load carrying bar 100, as seen in its cross sectional view. Moreover, according to an example embodiment of the present invention, the distinct angular shifts are angled such that they follow the perimeter profile of the load carrying bar 100. In other words, the distinct angular shifts follow the direction of the perimeter profile, and do not change the direction such that they significantly deviate from the perimeter profile. Hence, the distinct angular shifts are angled inwardly towards a center point of the load carrying bar's profile. On the contrary, e.g. a bulging portion would need at least two angular shifts angled outwardly with respect to a center point of the perimeter profile.

The invention is not limited to the embodiments described herein. It would be evident for the skilled person that other embodiments and modifications to the embodiments specified herein are also possible within the scope of the claims.

In the following, possible features and feature combinations of the load carrying bar 100 according to the second to fifth aspects are disclosed in item structure and form part of the disclosure of the present application.

Load carrying bar according to the second aspect:

1. A roof rack load carrying bar (100), comprising,
    a channel (101) for receiving at least one mounting member (10) for attaching a load carrying bar accessory to said load carrying bar (100), said channel (101) extending at least partly in a length direction (L) of said load carrying bar (100),
    at least a first cover (200) extending in said length direction (L) of said load carrying bar (100), said first cover (200) comprising a first attachment portion (211) for attaching said first cover (200) to said load carrying bar (100) and a first sealing portion (212) for sealing said channel (101) from an external environment, characterized in that,
    said first attachment portion (211) comprises or consist of a first material and said first sealing portion (212) comprises or consist of a second material different from said first material.
2. The load carrying bar (100) according to item 1, wherein a hardness of said first material is higher than a hardness of said second material.
3. The load carrying bar (100) according to any one of the preceding items, further comprising a second cover (300) extending in said length direction (L) of said load carrying bar (100), said second cover (300) comprising a second attachment portion (311) for attaching said second cover (300) to said load carrying bar (100) and a second sealing portion (312) for sealing said channel (101) from an external environment, wherein said second attachment portion (311) comprises or consist of a third material and said second sealing portion (312) comprises or consist of a fourth material different from said third material.
4. The load carrying bar (100) according to item 3, wherein a hardness of said third material is higher than a hardness of said fourth material.
5. The load carrying bar (100) according to any one of items 3-4, wherein said first (211) attachment portion and said second (311) attachment portion are asymmetrical with respect to each other, preferably with said asymmetry provided in a width direction (w) of said load carrying bar (100), said width direction (w) being perpendicular to said length direction (L).
6. The load carrying bar (100) according to any one of the preceding items, wherein at least one of said first (211) and said second (311) attachment portion is configured as a snap on attachment portion.
7. The load carrying bar (100) according to any one of the preceding items, wherein at least one of said first (211) and said second (311) attachment portion is configured as a groove (201; 301) or a protruding portion extending in said length direction (L) of said load carrying bar (100).
8. The load carrying bar (100) according to item 7, when said first (211) and/or said second (311) attachment portion is configured as a groove (201; 301), said groove (201; 301) comprising a first side wall (202; 302) and a second side wall (203; 303) facing said first side wall (202; 302), preferably wherein said second side wall (203; 303) is inclined away from said first side wall (202; 302).

9. The load carrying bar (100) according to item 8, wherein said second side wall (203; 303) comprises a hook portion (204; 304) at a distal end of said second side wall (203; 303)

10. The load carrying bar (100) according to item 8 or 9, wherein said first side wall (202; 302) further comprises a hook-shaped gripping member (205; 305) comprising a hook portion (206; 306), said hook-shaped gripping member (205; 305) being an extension of said first side wall (202; 302) with said hook portion (206; 306) bent from said first side wall (202; 302) by an angle being larger than 90 degrees with respect to said first side wall (202; 302).

11. The load carrying bar (100) according to any one of the preceding items, wherein at least one of said first (200) and said second (300) cover comprises an outer sealing surface (209; 309) substantially flush with an outer adjacent surface (105) of said load carrying bar (100).

12. The load carrying bar (100) according to any one of the preceding items, wherein at least one of said first (200) and said second (300) cover comprises an inner surface (210; 310) facing said channel (101), wherein said inner surface (210; 310) is inclined towards a side wall (106; 107) of said channel (101) being located on the same side as said cover (200; 300) comprising said inner surface (210; 310).

13. The load carrying bar (100) according to any one of the preceding items, wherein at least one of said first (200) and said second (300) cover comprises a friction reducing layer (208; 308) for reducing a friction between said at least one cover (200; 300) and said at least one mounting member (10).

14. The load carrying bar (100) according any one of the preceding items, wherein said first cover (200) comprises an airflow regulating pattern (400) extending in a length direction (L) of said load carrying bar ( ), said pattern (400) comprising at least two raised rib portions (401, 402) relatively offset from each other in said length direction (L) of said load carrying bar (100).

Load carrying bar according to the third aspect:
1. A roof rack load carrying bar (100), comprising,
    a channel (101) for receiving at least one mounting member (10) for attaching a load carrying bar accessory to said load carrying bar (100), said channel (101) extending at least partly in a length direction (L) of said load carrying bar (100),
    at least a first cover (200) extending in said length direction (L) for sealing said channel (101) from an external environment, said first cover (200) comprising an attachment portion (211), said attachment portion (211) comprising a groove (201) extending in said length direction (L) attaching said first cover (200) to a corresponding protruding portion (102) extending in said length direction (L) on said load carrying bar (100), said groove (201) comprising a first (202) and a second (203) side wall, characterized in that,
said attachment portion (211) further comprising a hook-shaped gripping member (205) comprising a hook portion (206), said hook-shaped gripping member (205) being an extension of said first side wall with said hook portion (206) bent from said first side wall (202) by an angle being larger than 90 degrees with respect to said first side wall (202).

2. The load carrying bar (100) according to item 1, wherein said hook portion (206) is bent from said first side wall (202) by an angle being larger than any one of 100, 110, 120, 130, 140 and 150 degrees with respect to said first side wall (202)

3. The load carrying bar (100) according to any one of the preceding items, wherein said hook portion (206) is bent outwardly from said groove (201).

4. The load carrying bar (100) according to any one of items 1-2, wherein said hook portion is bent inwardly into said groove.

5. The load carrying bar (100) according to any one of the preceding items, wherein said hook portion (206) is arranged to snap into a corresponding receiving portion (108) on said load carrying bar (100) for locking said at least first cover (200) to said load carrying bar (100).

6. The load carrying bar (100) according to any one of the preceding items, wherein said first side wall (202) extends substantially perpendicularly out from an upper surface (213) of said at least one first cover (200).

7. The load carrying bar (100) according to any one of the preceding items, wherein said second side wall (203) faces said first side wall (202), and wherein said second side wall (203) is inclined away from said first side wall (202).

8. The load carrying bar (100) according to any one of the preceding items, wherein said second side wall (203) comprises a hook portion (204) at an outer end of said second side wall (203)

Load carrying bar according to the fourth aspect:
1. A roof rack load carrying bar (100), comprising,
    an airflow regulating pattern (400) extending in a length direction (L) of said load carrying bar (100), said pattern (400) comprising at least two raised rib portions (401, 402) relatively offset from each other in said length direction (L) of said load carrying bar (100), wherein each one of said at least two raised rib portions (401, 402) is diagonally arranged with respect to a travel direction (T) of said load carrying bar (100) during use and further has a portion width (d1) measured in said length direction (L) of said load carrying bar (100), wherein two adjacent raised rib portions (401, 402) are separated by a separation distance (L1) in said length direction (L) of said load carrying bar (100), characterized in that, said separation distance (L1) is at least two times greater than the portion width (d1) of at least one of said adjacent raised rib portions (401, 402).

2. The load carrying bar (100) according to item 1, wherein said pattern (400) extends along at least 80% of a load carrying bar length (L10) in said length direction (L).

3. The load carrying bar (100) according to any one of the preceding items, wherein said pattern (400) is a continuous reoccurring pattern in said length direction (L), preferably with at least 10, 15, 20, 25, 30, 35, 40 raised rib portions (401, 402).

4. The load carrying bar (100) according to any one of the preceding items, wherein at least one of said at least two raised rib portions (406, 407, 408, 409, 410, 411) is a V-shaped rib portion with a tip of said V-shape pointing in said travel direction (T).

5. The load carrying bar (100) according to any one of the preceding items, further comprising a channel (101) for receiving at least one mounting member (10) for attaching a load carrying bar accessory to said load carrying bar (100), said channel (101) extending at least partly in a length direction (L) of said load carrying bar (100), wherein said pattern (400) is at least partly located in front of said channel (101) with respect to said travel direction (T).

6. The load carrying bar (100) according to item 5, said load carrying bar (100) further comprising at least a first cover (200) extending in said length direction (L) for sealing said channel (101) from an external environment, wherein said pattern (400) is located on said first cover (200).

7. The load carrying bar (100) according to any one of the preceding items, wherein said portion width (d1) of at least one of said adjacent raised rib portions is from 0.5 to 3 millimeters (mm), preferably 0.7-2.5 mm, more preferably 0.7-2 mm, such as 0.8-1.2 mm.

8. The load carrying bar (100) according to any one of the preceding items, wherein at least one of said at least two rib portions (401, 402) has a rib height from 0.3 to 2 mm, preferably 0.5-2 mm, such as 0.5-1 mm.

9. The load carrying bar (100) according to any one of the preceding items, wherein at least one of said at least two raised rib portions (401, 402) is configured as a distinct raised rib portion with an angle ($\alpha_1$) between a surface (214) onto which said at least one rib portion (401, 402) is located and a side wall (403) of said rib portion which is at least 90 degrees, such as from 90 to 120 degrees or 90-140 degrees.

Load carrying bar according to the fifth aspect:

1. A roof rack load carrying bar (100), comprising,
    a cross sectional profile having a front bar portion (109) and a rear bar portion (110) with respect to a travel direction (T) of said load carrying bar (100) during use, said front bar portion (109) having a front edge (111), said rear bar portion (110) having a profile (112) tapering rearwards with respect to said travel direction (T) and towards a rear edge (113) of said rear bar portion (110), said front edge (111) comprising a first curved-shaped profile (114) extending from an upper portion (115) to a lower portion (116) of said front bar portion (109), characterized in that,
at least one of said first curved-shaped profile (114) and said rear edge (113) having a first distinct angular shift (117, 118, 119).

2. The load carrying bar (100) according to item 1, wherein said first curved-shaped profile (114) has the first distinct angular shift (117) at a very front portion (120) of said front edge (111).

3. The load carrying bar (100) according to item 2, wherein said first curved-shaped profile (114) further has a second distinct angular shift (118) approximately half-way up from said very front portion (120) with respect to said upper portion (115) of said front bar portion (109).

4. The load carrying bar (100) according to any one of the preceding items, wherein said cross sectional profile is a wing-shaped profile.

5. The load carrying bar (100) according to any one of the preceding items, wherein said at least one angular shift is from 5 to 60 degrees, preferably from 10 to 30 degrees, such as 10-20 degrees.

The invention claimed is:

1. A roof rack load carrying bar comprising:
    a channel for receiving at least one mounting member for attaching a load carrying bar accessory to said load carrying bar, said channel extending at least partly in a length direction of said load carrying bar,
    a first cover and a second cover each disposed at least partially over an opening to said channel and extending in said length direction, wherein said first cover is disposed forward of said second cover relative to a travel direction of said load carrying bar during use, wherein said first cover has a first portion that abuts an outside edge of the load carrying bar forward of said channel and is disposed at least partially over a flange that defines a portion of said channel, wherein said first cover has a second portion disposed over said opening to said channel, and wherein said first portion of said first cover is disposed entirely forward of said second portion of said first cover; and
    an airflow regulating pattern comprising at least two raised rib portions on said first portion of said first cover offset from each other in said length direction,
    wherein each one of said at least two raised rib portions extends from a front of said first portion of said first cover to a rear of said first portion of said first cover,
    wherein two adjacent raised rib portions are separated by a separation distance in said length direction, and
    wherein each one of said at least two raised rib portions has a portion width measured in said length direction.

2. The load carrying bar according to claim 1, wherein said airflow regulating pattern extends along at least 80% of a load carrying bar length in said length direction.

3. The load carrying bar according to claim 1, wherein said airflow regulating pattern is a reoccurring pattern in said length direction.

4. The load carrying bar according to claim 1, wherein said portion width of at least one of said adjacent raised rib portions is from 0.5 to 3 mm.

5. The load carrying bar according to claim 1, wherein said portion width of at least one of said adjacent raised rib portions is from 0.7 to 2.5 mm.

6. The load carrying bar according to claim 1, wherein said portion width of at least one of said adjacent raised rib portions is from 0.8 to 1.2 mm.

7. The load carrying bar according to claim 1, wherein at least one of said at least two rib portions has a rib height from 0.3 to 2 mm.

8. The load carrying bar according to claim 1, wherein at least one of said at least two rib portions has a rib height from 0.5 to 1 mm.

9. The load carrying bar according to claim 1, wherein at least one of said at least two raised rib portions is configured as a distinct raised rib portion with an angle between a surface onto which said at least one rib portion is located and a side wall of said rib portion which is at least 90 degrees.

10. The load carrying bar according to claim 1, wherein at least one of said at least two raised rib portions is configured as a distinct raised rib portion with an angle between a surface onto which said at least one rib portion is located and a side wall of said rib portion which is from 90 to 120 degrees.

11. The load carrying bar according to claim 1, wherein at least one of said at least two raised rib portions is configured as a distinct raised rib portion with an angle between a surface onto which said at least one rib portion is located and a side wall of said rib portion which is from 90 to 140 degrees.

12. The load carrying bar according to claim 1, wherein said separation distance is at least two times greater than said portion width of at least one of said adjacent raised rib portions.

13. The load carrying bar according to claim 1, wherein said first cover is formed of a polymer, elastomer, or rubber.

14. The load carrying bar according to claim 1, wherein said first portion of said first cover and said second portion of said first cover meet above an inner edge of said flange.

15. The load carrying bar according to claim 1, wherein said first cover and said second cover meet above said opening to said channel.

16. The load carrying bar according to claim 1, wherein said airflow regulating pattern is disposed over a majority of said flange.

17. A roof rack load carrying bar comprising:
   a channel for receiving at least one mounting member for attaching a load carrying bar accessory to said load carrying bar, said channel extending at least partly in a length direction of said load carrying bar,
   a first cover and a second cover each disposed at least partially over an opening to said channel and extending in said length direction, wherein said first cover is disposed forward of said second cover relative to a travel direction of said load carrying bar during use, wherein said first cover has a rearward portion disposed over said opening to said channel and a forward portion disposed entirely forward of said rearward portion; and
   an airflow regulating pattern comprising at least two raised rib portions offset from each other in said length direction,
   wherein said raised rib portions are disposed only on said forward portion of said first cover,
   wherein said raised rib portions are disposed at least partially above a flange that defines a portion of said channel, and extend forward of said flange to an edge of the load carrying bar,
   wherein adjacent raised rib portions are separated by a separation distance in said length direction, and
   wherein each of said raised rib portions has a portion width measured in said length direction.

18. The load carrying bar according to claim 17, wherein a trailing edge of said first cover is configured to contact a leading edge of said second cover over said channel.

19. The load carrying bar according to claim 17, wherein said airflow regulating pattern consists of a single row of raised rib portions.

20. The load carrying bar according to claim 17, wherein said first cover is formed of a polymer, elastomer, or rubber.

21. The load carrying bar according to claim 17, wherein at least one of said raised rib portions is a V-shaped rib portion with a tip of said V-shape pointing in said travel direction.

22. The load carrying bar according to claim 17, wherein said separation distance is at least two times greater than said portion width of at least one of said adjacent raised rib portions.

23. The load carrying bar according to claim 17, wherein said rearward portion of said first cover is disposed at least partially above said flange.

24. The load carrying bar according to claim 17, wherein said rearward portion of said first cover is disposed entirely above or in said opening to said channel.

* * * * *